US011249471B2

(12) United States Patent
Song et al.

(10) Patent No.: US 11,249,471 B2
(45) Date of Patent: Feb. 15, 2022

(54) METHOD, DEVICE, AND UNMANNED AERIAL VEHICLE FOR CONTROLLING MOVABLE OBJECT

(71) Applicant: SZ DJI TECHNOLOGY CO., LTD., Shenzhen (CN)

(72) Inventors: Liang Song, Shenzhen (CN); Yazhen Wei, Shenzhen (CN); Qing Zhu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 273 days.

(21) Appl. No.: 16/406,484

(22) Filed: May 8, 2019

(65) Prior Publication Data

US 2019/0265696 A1 Aug. 29, 2019

Related U.S. Application Data

(63) Continuation of application No. PCT/CN2016/105965, filed on Nov. 15, 2016.

(51) Int. Cl.
*G05D 1/00* (2006.01)
*H04B 17/318* (2015.01)
*G05D 1/02* (2020.01)

(52) U.S. Cl.
CPC ......... *G05D 1/0022* (2013.01); *G05D 1/0011* (2013.01); *G05D 1/0055* (2013.01); *G05D 1/0212* (2013.01); *H04B 17/318* (2015.01)

(58) Field of Classification Search
CPC .. G05D 1/0022; G05D 1/0011; G05D 1/0055; G05D 1/0212; G05D 1/101; H04B 17/318; B64C 2201/14; B64C 39/024

USPC ............................................................. 701/2
See application file for complete search history.

(56) References Cited

U.S. PATENT DOCUMENTS

| 6,377,875 | B1 | 4/2002 | Schwaerzler | |
|---|---|---|---|---|
| 9,087,451 | B1* | 7/2015 | Jarrell | .................. G08G 5/0091 |
| 2015/0025710 | A1 | 1/2015 | Park | |
| 2015/0336668 | A1* | 11/2015 | Pasko | ................... B64C 39/024 701/2 |
| 2016/0117853 | A1 | 4/2016 | Zhong et al. | |

(Continued)

FOREIGN PATENT DOCUMENTS

| CN | 101322882 | * 12/2008 |
|---|---|---|
| CN | 101322882 A | 12/2008 |

(Continued)

OTHER PUBLICATIONS

World Intellectual Property Organization (WIPO) International Search Report for PCT/CN2016/105965 dated Aug. 17, 2017 6 Pages.

(Continued)

*Primary Examiner* — Muhammad Shafi
(74) *Attorney, Agent, or Firm* — Anova Law Group, PLLC

(57) ABSTRACT

A method for controlling a movable object includes obtaining a signal strength of a remote control signal received by the movable object, obtaining a movement path of the movable object in response to the signal strength being less than a preset strength threshold, controlling the movable object to enter a backtrack return mode to return along the movement path, and controlling the movable object to exit the backtrack return mode in response to the signal strength being greater than the preset strength threshold.

18 Claims, 6 Drawing Sheets

(56) References Cited

U.S. PATENT DOCUMENTS

| 2016/0313734 | A1 | 10/2016 | Enke | |
|---|---|---|---|---|
| 2017/0012697 | A1* | 1/2017 | Gong | B64C 39/024 |
| 2017/0269611 | A1* | 9/2017 | Rangarajan | B64C 39/024 |
| 2018/0038695 | A1* | 2/2018 | Bitra | G08G 5/0069 |

FOREIGN PATENT DOCUMENTS

| CN | 102722178 A | 10/2012 |
|---|---|---|
| CN | 102800178 A | 11/2012 |
| CN | 102945046 A | 2/2013 |
| CN | 104258573 A | 1/2015 |
| CN | 104516354 A | 4/2015 |
| CN | 104781781 A | 7/2015 |
| CN | 104881039 A | 9/2015 |
| CN | 104881041 A | 9/2015 |
| CN | 105243878 A | 1/2016 |
| CN | 105487554 A | 4/2016 |
| CN | 105492985 A | 4/2016 |
| CN | 105511492 A | 4/2016 |
| CN | 105676872 A | 6/2016 |
| CN | 205405271 U | 7/2016 |
| CN | 105824324 A | 8/2016 |
| CN | 105867423 A | 8/2016 |
| CN | 105955296 A | 9/2016 |
| CN | 205586573 U | 9/2016 |
| GB | 2218517 A | 11/1989 |
| JP | H08241123 A | 9/1996 |
| JP | 2809127 B2 | 10/1998 |
| WO | 2014063537 A1 | 5/2014 |
| WO | 2016065513 A1 | 5/2016 |
| WO | 2016095095 A1 | 6/2016 |

OTHER PUBLICATIONS

Jun Qian," A Fire Reconnaissance Robot Working Safely in Urban Environments", Robot, vol. 28, No.6, Nov. 2006.

* cited by examiner

METHOD, DEVICE, AND UNMANNED AERIAL VEHICLE FOR CONTROLLING MOVABLE OBJECT

CROSS-REFERENCE TO RELATED APPLICATION

This application is a continuation application of International Application No. PCT/CN2016/105965, filed on Nov. 15, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to control technologies and, more particularly, to a method for controlling a movable object, and a device, a storage medium, and an unmanned aerial vehicle for controlling a movable object.

BACKGROUND

In conventional technologies, movable objects are usually wirelessly controlled by an operator using a remote controller. Taking an unmanned aerial vehicle (UAV) as an example, when a remote control signal is relatively good, the operator is in charge of safety of the UAV. However, since remote control signals usually use open frequency bands such as 2.4 GHz or 5.8 GHz frequency band, power of the remote control signal is limited and susceptible to interference. For example, when the remote control signal is blocked by obstacles such as hills or buildings, the remote control signal can be relatively easy to be interrupted. The interruption of the remote control signal can influence safety of the UAV and even cause the UAV to crash.

SUMMARY

In accordance with the disclosure, there is provided a method for controlling a movable object including obtaining a signal strength of a remote control signal received by the movable object, obtaining a movement path of the movable object in response to the signal strength being less than a preset strength threshold, controlling the movable object to enter a backtrack return mode to return along the movement path, and controlling the movable object to exit the backtrack return mode in response to the signal strength being greater than the preset strength threshold.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Exemplary embodiments will be described with reference to the accompanying drawings, in which the same numbers refer to the same or similar elements unless otherwise specified.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

Further, in the present disclosure, the disclosed embodiments and the features of the disclosed embodiments may be combined when there are no conflicts.

The technical solutions of the embodiments of the present disclosure can be applied to various types of movable objects that can move according to an external remote control signal. For example, the movable object may include an unmanned aerial vehicle (UAV), an unmanned ship, a robot, or the like that can move in the air, on land, in water, or in space, but is not limited thereto in the present disclosure. That is, the movable object may include any type of mobile device that can be remotely controlled. Hereinafter, for description purposes, a UAV will be described as an example.

The following embodiments do not limit the execution sequence of the processes of the methods protected by the present disclosure. The various processes of the methods of the present disclosure can be performed in any possible sequence and/or in a cyclical manner.

Figure 1:
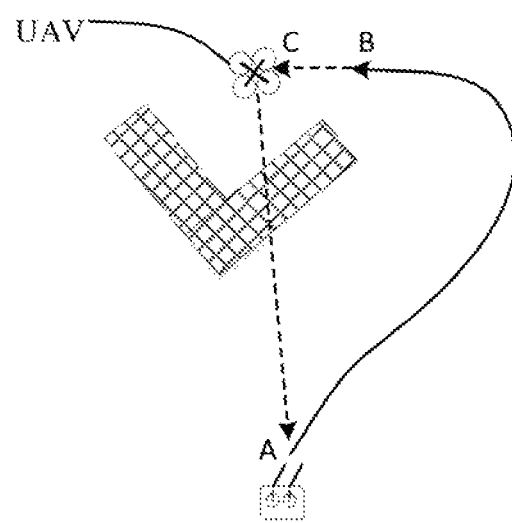
FIG. 1 illustrates a schematic diagram of a direct return flight of an unmanned aerial vehicle (UAV) in an event of loss of remote control signal.

As a UAV flies in a complex terrain, such as a tall building, a mountain, a river valley, a cliff, or the like, a return flight may be triggered relatively easily because a remote control signal is blocked, and the UAV may encounter obstacles and crash relatively easily during the return flight. FIG. 1 illustrates a schematic diagram of a direct return flight of a UAV in an event of loss of remote control signal. As shown in FIG. 1, an operator remotely controls the UAV to take off from point A and intends to control the UAV to fly around a building. After the UAV reaches point B, the remote control signal is suddenly lost due to blocking of the building. However, the UAV continues to fly forward to point C due to momentum. At point C, the UAV determines that the remote control signal has been lost and begins performing a direct return flight operation.

In the direct return flight operation, two types of options are usually adopted. In a first type, the UAV returns from point C to point A along a straight line according to a current height, e.g., at a current height. In a second type, the UAV ascends to a preset height, and then returns to point A from point C along a straight line. However, no matter which one of the two types of options is adopted, since the remote control signal is blocked by the building and is at an interrupted status, the operator cannot control the UAV, and the UAV can only rely on a built-in return flight logic for an autonomous return. When the first type of option is adopted for the return flight, the UAV may directly hit the building. When the height of the building is higher than the preset height in the UAV, even if the second type of option is adopted, the UAV cannot avoid colliding with the building.

In addition, for a UAV equipped with an obstacle sensor, although the UAV can detect an obstacle in front and stop, or further detect a feasible path autonomously in a small area. However, due to complexity of actual environment, the method, e.g., of using the obstacle sensor, is often invalid. The end result is usually that the UAV stops before the obstacle until battery or fuel of the UAV is exhausted, and eventually is forced to land or crashes. In conventional technologies, UAVs are unable to handle complex and variable terrain environments through intelligent obstacle avoidance algorithms and sensor technologies.

To avoid the problem that the UAV cannot perform a return flight correctly due to a complex terrain, a flight path of the UAV from the take-off can be recorded. Thus, when the remote control signal is lost, the UAV can backtrack to the take-off point according to the recorded flight path. However, this approach may lead to following issues. The UAV may have flown a long distance before losing the remote control signal. If the UAV backtracks strictly along the recorded flight path, the UAV may run out of electricity or fuel during the return flight, thereby disturbing safety of the UAV. Further, if the UAV needs to return to the take-off point once the remote control signal is lost, continuity of the flight may be disturbed and operator experience may be disturbed. In addition, the UAV performs the return flight after the remote control signal is lost, and hence the UAV is uncontrolled by the operator and is unable to send back image signals for a certain time period, thereby causing the operator to panic.

As compared to the approach of automatically returning to the take-off point, in another approach, ensuring smoothness of the remote control signal may be attempted in a complex environment, and the UAV seeks a location of relatively good remote control signal before the remote control signal is entirely lost. Further, under the condition that a stable remote control signal is ensured, returning to the take-off point or continuing the remote control flight may be chosen according to, e.g., electric power.

Figure 2:
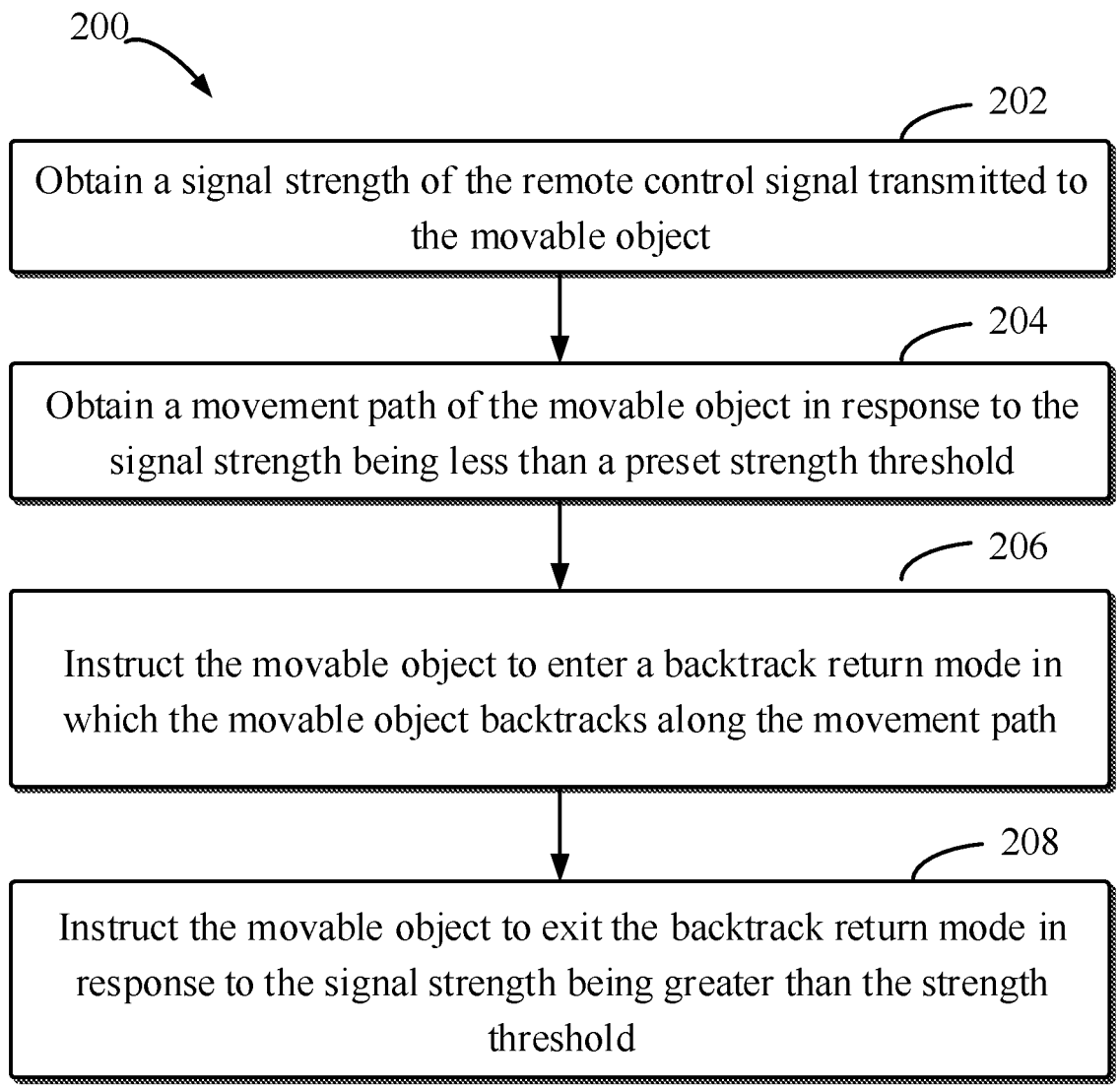
FIG. 2 illustrates a flow chart of an exemplary method for controlling a movable object consistent with various disclosed embodiments of the present disclosure.

FIG. 2 illustrates a flow chart of an exemplary method 200 for controlling a movable object consistent with various disclosed embodiments of the present disclosure.

As shown in FIG. 2, at 202, a signal strength of the remote control signal transmitted to the movable object is obtained.

In some embodiments, the signal strength of the remote control signal detected by a signal strength detection apparatus may be obtained. The signal strength detection apparatus can detect a power value of the remote control signal and obtain a signal strength value according to the power value. In some embodiments, the signal strength of the remote control signal may be periodically obtained at a preset time interval. In some embodiments, the time interval may be dynamically changeable.

At 204, a movement path of the movable object is obtained in response to the signal strength being less than a preset strength threshold. Correspondingly, the movable object can be controlled to search for a relatively strong and relatively stable remote control signal before the remote control signal is entirely lost. Thus, the remote control signal and image signal may not be prevented from being entirely interrupted, thereby avoiding panic of the operator.

In some embodiments, obtaining the movement path of the movable object may include obtaining a movement path from a movement start point of the movable object. In some embodiments, the obtained movement path may include position information of a plurality of discrete points, and the movement path can be restored by fitting the plurality of discrete points. The position information may include, for example, longitude, latitude, and/or altitude. In some embodiments, the longitude, the latitude, and/or the altitude may be calculated based on detection by a device including a satellite positioning system, e.g., Global Position System (GPS), Beidou, Galileo, Global Navigation Satellite System (GLONASS), etc., arranged in the movable object. Further, the position information may be calculated by fusing sensing information of an accelerometer, a gyroscope, a barometer, a geomagnetic sensor, a satellite positioning system, and/or an auxiliary positioning sensor, such as an infrared sensor, a laser sensor, an ultrasound sensor, a vision sensor, etc., arranged in the movable object. Accordingly, accuracy of the position information may be ensured. According to the movement path beginning at the movement start point of the movable object, the movable object can further be instructed to continue to return to the movement start point. In some embodiments, the movement path may further include time information associated with the plurality of discrete points. Thus, even if the movement path of the movable object has an overlapping portion, the movement path can be determined.

In some embodiments, obtaining the movement path of the movable object may include obtaining a movement intermediate point of the movable object. In some embodiments, the movement intermediate point may include a signal recovery point at which the strength of the remote control signal is greater than the strength threshold. In some embodiments, the movement intermediate point may include can also include a signal rediscovery point at which the remote control signal is rediscovered. In some embodiments, the movement intermediate point may include another point at which the remote control signal undergoes a change.

In some embodiments, obtaining the movement path of the movable object may include obtaining a movement path from a preset point. In some embodiments, the preset point may include a point chosen by the operator or automatically generated, at which a geographic environment changes. For example, the preset point may include an entry point from an open area to a mountainous area, an entry point from the operator's visible range to the operator's invisible range, an entry point from a low-interference area to a high-interference area, and/or the like.

In some embodiments, the method 200 may further include recording a movement path of the movable object. In some embodiments, the position information and the time information of the movable object can be periodically recorded at preset time intervals. The time interval may be, for example, dynamically changeable.

In some embodiments, the position information and time information of the movable object can be recorded at variable time intervals according to speed and movement direction of the movable object. In some embodiments, the time interval may be shortened in response to the speed of the movable object being increased, and the time interval may be extended in response to the speed of the movable object being decreased. Thus, it can be ensured that the position information of the discrete points can be recorded at intervals of the same or approximately the same movement distance of the movable object, and it can be ensured that the movement path satisfying accuracy need can be restored by fitting the recorded discrete points. In some embodiments, the time interval may be shortened in response to a movement direction of the movable object changing relatively fast, and the time interval may be extended in response to a moving direction of the movable object changing relatively slowly. Correspondingly, relatively more information can be obtained at a turning location of the movement path, ensuring that a turning path of the movable object can be restored with a high precision fitting.

In some embodiments, obtaining the movement path of the movable object in response to the signal strength being less than the preset strength threshold may include obtaining a movement path of the movable object in response to the remote control signal being disconnected. In these embodiments, the strength threshold may include a minimum value of the strength of the remote control signal that can be received by the movable object.

At 206, the movable object is instructed to enter, e.g., activate, a backtrack return mode in which the movable object backtracks along the movement path. Since the movable object returns reversely along the traversed path, possibility that the movable object collides on the way back can be reduced.

At 208, in response to the signal strength being greater than the strength threshold, the movable object is instructed to exit the backtrack return mode. By this approach, under the condition that stability of the remote control signal is ensured, the movable object may not be forced to continue backtracking to a start point, but can operate in a relatively flexible manner.

In some embodiments, after the movable object is instructed to exit the backtrack return mode, the movable object may be instructed to continue to return to the movement start point.

In some embodiments, the movable object may be instructed to enter a backtrack return-to-start-point mode in which the movable object continues to return to the movement start point along the movement path. Since the movable object continues to backtrack, possibility that the movable object collides on the way back can be reduced.

Figure 3:
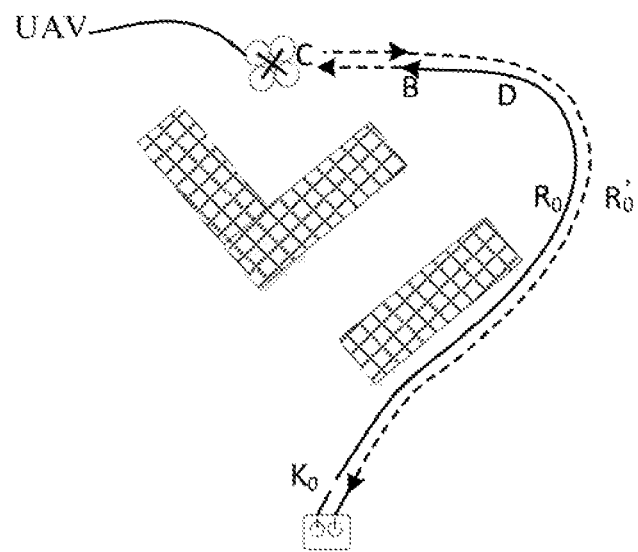
FIGS. 3 to 5 illustrate schematic diagrams of movement paths of UAV consistent with various disclosed embodiments of the present disclosure.

FIG. 3 illustrates a schematic diagram of a movable object backtracking to a start point. In FIG. 3, a UAV is taken as an example. The UAV flies along path $R_0$ from a take-off point $K_0$. When the UAV reaches point B, the remote control signal strength is less than a preset strength threshold because the remote control signal is blocked by a building. However, the UAV continues flying forward to point C due to momentum. At point C, the UAV enters the backtrack return mode. In the backtrack return mode, the UAV returns to point D along a reverse path $R'_0$ of path $R_0$. Since the remote control signal strength at point D is greater than the preset strength threshold, the UAV exits the backtrack return mode and enters the backtrack return-to-start-point mode according to an instruction. In the backtrack return-to-start-point mode, the UAV continues to return to the take-off point $K_0$ along the reverse path $R'_0$.

In some embodiments, the movable object may be instructed to enter a straight-line return-to-start-point mode in which the movable object continues to return to the movement start point along a straight line. By this approach, the movable object can return to the start point in an energy-saving manner. Further, when the movable object appears within a field of view of the operator, the use of the straight-line return-to-start-point mode may not affect safety of the movable object.

Figure 4:
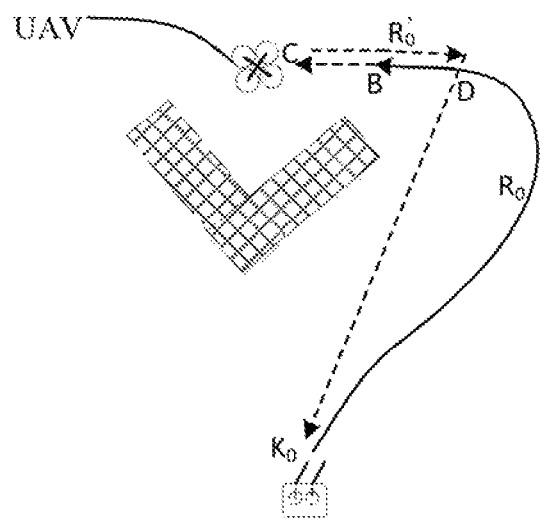

FIG. 4 illustrates a schematic diagram of a movable object returning to a start point along a straight line. In FIG. 4, a UAV is taken as an example. Similar to FIG. 3, the UAV flies along the path $R_0$ from a take-off point $K_0$. When the UAV reaches point B, the remote control signal strength is less than a preset strength threshold because the remote control signal is blocked by a building. However, the UAV continues flying forward to point C due to momentum. At point C, the UAV enters the backtrack return mode. In the backtrack return mode, the UAV returns to point D along a reverse path $R'_0$ of path $R_0$. Since the remote control signal strength at point D is greater than the preset strength threshold, the UAV exits the backtrack return mode. However, different from the examples described in connection with FIG. 3, in FIG. 4, after exiting the backtrack return mode, the UAV enters a straight-line return-to-start-point mode. In some embodiments, the UAV flies from point D to the take-off point $K_0$ along a straight line.

In some embodiments, the movable object may be instructed to enter a backtrack return-to-start-point mode or a straight-line return-to-start-point mode according a remaining power amount. Correspondingly, exhaustion of energy of the movable object on the way back to the start point can be prevented.

In some embodiments, instructing the movable object to continue to return to the movement start point may include instructing the movable object to return to a movement intermediate point along the movement path, determining a return path from the movement intermediate point to the movement start point, and instructing the movable object to return to the movement start point along the return path. In some embodiments, the movement intermediate point may include a signal recovery point at which the strength of the remote control signal is greater than the strength threshold. In some embodiments, the movement intermediate point may include a signal rediscovery point at which the remote control signal is rediscovered. In some embodiments, the movement intermediate point may include another point at which the remote control signal undergoes a change. In some embodiments, the movable object can move to the movement intermediate point with a relatively high signal strength and further return to the start point from the movement intermediate point. Accordingly, the movable object can return to the start point without entirely following the original path, reducing a distance that the movable object takes to return to the start point.

Figure 5:
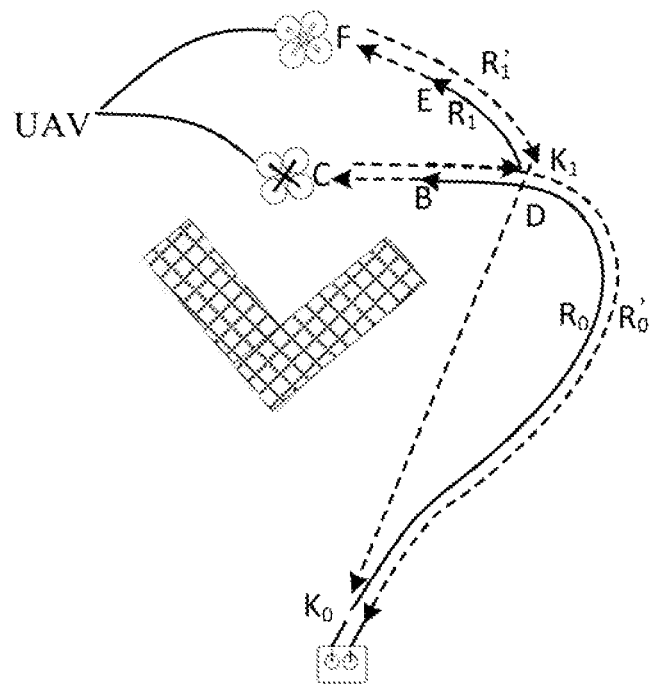

FIG. 5 illustrates a schematic diagram of the UAV returning to a start point via a movement intermediate point. In FIG. 5, a UAV is taken as an example. Similar to examples described in connection with FIG. 3, the UAV flies along path $R_0$ from a take-off point $K_0$. When the UAV reaches point B, the remote control signal strength is less than a preset strength threshold because the remote control signal is blocked by a building. However, the UAV continue flying forward to point C due to momentum. At point C, the UAV enters the backtrack return mode. In the backtrack return mode, the UAV returns to point D along a reverse path $R'_0$ of path $R_0$. Since the remote control signal strength at point D is greater than the preset strength threshold, the UAV exits the backtrack return mode. However, different from examples described in connection with FIG. 3, in FIG. 5, after exiting the backtrack return mode, the UAV enters a remote control mode according to an instruction, and the UAV records an intermediate point $K_1$ at which the operator takes over control of the UAV. The operator remotely controls the UAV to fly from the movement intermediate point $K_1$ along path $R_1$. When the UAV reaches point E, since the remote control signal is blocked by the building, the remote signal strength is less than the preset strength threshold, and the UAV continues to fly forward to point F due to momentum. At point F, the UAV enters the backtrack return mode. In some embodiments, the UAV returns to the intermediate point $K_1$ along a reverse path $R'_1$ of path $R_0$. At the movement intermediate point $K_1$, the UAV can return to the take-off point $K_0$ along the reverse path $R'_0$ or along a straight line according to an instruction.

According to examples described in connection with FIG. 5, since the movement intermediate point $K_1$ is introduced, as the UAV backtracks to the movement intermediate point $K_1$ and enters the backtrack return-to-start-point mode, the UAV can return to the take-off point $K_0$ along the recorded reverse path $R'_0$, without the need to pass point B and point C for returning to the take-off point $K_0$. Accordingly, energy consumption of the UAV can be reduced.

In some embodiments, the return path may include a portion of the movement path. Correspondingly, collision of the movable object can be suppressed during the return from the movement intermediate point to the start point.

In some embodiments, the movable object may be prohibited from entering the backtrack return mode after the movable object is instructed to continue to return to the movement start point. By this approach, in a process of the movable object returning to the start point, if the remote control signal is lost or recovered again, the movable object may ignored the loss or recovery of the remote control signal and a new return action may not be triggered. Accordingly, an extension of the path of the movable object returning to the start point may be avoided, and hence consumption of unnecessary energy and danger may be avoided.

In some embodiments, after the movable object is instructed to exit the backtrack return mode, the movable object may be instructed to enter a remote control mode in which the movable object moves according to the remote control signal. By this approach, after it is ensured that the remote control signal of the movable object is stabilized, control right can be handed over to the operator, thereby not excessively disturbing the operator's experience.

In some embodiments, after the movable object is instructed to exit the backtrack return mode, the movable object may be instructed to continue to return to the preset point. In some embodiments, the preset point may include a point chosen by the operator or automatically generated, at which a geographic environment changes. For example, the preset point may include an entry point from an open area to a mountainous area, an entry point from the operator's visible range to the operator's invisible range, an entry point from a low-interference area to a high-interference area, and/or the like. By this approach, the movable object can return to a point where a geographical environment is relatively safe, thereby avoiding signal loss and resulting collisions and further improving safety.

In some embodiments, the method described in connection with FIG. 2 may further include sending a movement mode inquiry signal in response to the signal strength of the remote control signal being greater than the strength threshold, receiving a movement mode reply signal, determining a movement mode of the movable object according to the movement mode reply signal. By this approach, under a condition that the remote control signal is stable, the operator can choose the movement mode.

In some embodiments, a movement mode inquiry signal can be sent to a remote controller used by the operator. For example, an operation interface of the remote controller may pop up a window to inform the operator that the remote control signal has been restored, and ask the operator to select among three options of "backtrack return-to-start-point mode," "straight-line return-to-start-point mode," and "remote control mode." In some embodiments, in response to the operator making no selection, the backtrack return mode may be activated to ensure that the movable object returns safely.

Figure 6:
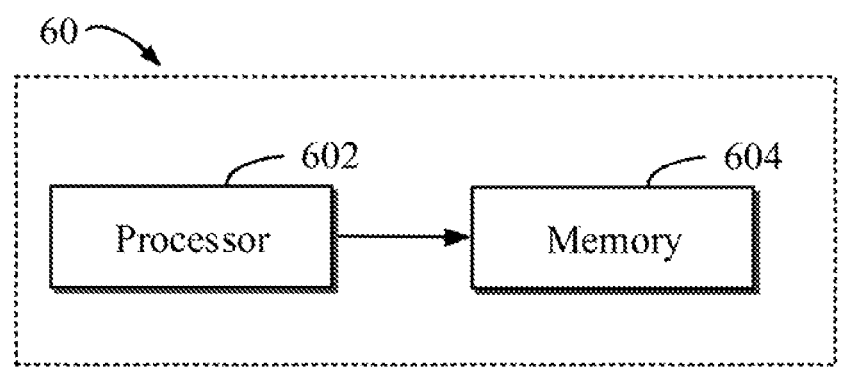
FIG. 6 illustrates a schematic block diagram of an exemplary device for controlling a movable object consistent with various disclosed embodiments of the present disclosure.

FIG. 6 illustrates a schematic block diagram of an exemplary device 60 for controlling a movable object consistent with various disclosed embodiments of the present disclosure.

As shown in FIG. 6, the device 60 includes a processor 602 and a memory 604. The memory 604 is configured to store computer executable instructions, and the processor 602 is configured to access the memory and execute the computer executable instructions to perform following operations: obtaining a signal strength of a remote control signal transmitted to the movable object; obtaining a movement path of the movable object in response to the signal strength being less than a preset strength threshold; instructing the movable object to enter a backtrack return mode, in which the movable object returns along the movement path, and in response to the signal strength being greater than the strength threshold, instructing the movable object to exit the backtrack return mode.

In some embodiments, the processor 604 may be configured to obtain a movement path beginning at a movement start point of the movable object. In addition, the processor 604 may be further configured to instruct the movable object to continue to return to the movement start point after instructing the movable object to exit the backtrack return mode.

In some embodiments, the processor 604 may be configured to instruct the movable object to enter a backtrack return-to-start-point mode in which the movable object continues to return to the movement start point along the movement path.

In some embodiments, the processor 604 may be configured to instruct the movable object to enter a straight-line return-to-start-point mode in which the movable object continues to return to the movement start point along a straight line.

In some embodiments, the processor 604 may be configured to instruct the movable object to enter a backtrack return-to-start-point mode or a straight-line return-to-start-point mode according to a remaining power amount of the movable object.

In some embodiments, the processor 604 may be configured to obtain a movement intermediate point of the movable object; to instruct the movable object to return to the movement intermediate point along the movement path; and to determine a return path from the movement intermediate point to the movement start point; and to instruct the movable object to return to the movement start point along the return path.

In some embodiments, the movement intermediate point may include a signal recovery point at which the strength of the remote control signal is greater than the strength threshold.

In some embodiments, the return path may include a portion of the movement path.

In some embodiments, the processor 604 may be configured to prohibit the movable object from entering the backtrack return mode after instructing the movable object to continue to return to the movement start point.

In some embodiments, the processor 604 may be configured to instruct the movable object to enter a remote control mode, after instructing the movable object to exit the backtrack return mode. In the remote control mode, the movable object moves according to a remote control signal.

In some embodiments, the processor 604 may be configured to obtain a movement path beginning at a preset point. In addition, the processor 604 may be further configured to instruct the movable object to continue to return to the preset point after instructing the movable object to exit the backtrack return mode.

In some embodiments, the processor 604 may be configured to record a movement path of the movable object.

In some embodiments, the processor 604 may be configured to periodically record position information and time information of the movable object at preset time intervals.

In some embodiments, the processor 604 may be configured to record position information and time information of the movable object at variable time intervals according to speed and movement direction of the movable object.

In some embodiments, the position information may include longitude, latitude, and/or altitude of the movable object.

In some embodiments, the processor 604 may be configured to obtain a movement path of the movable object in response to the remote control signal being disconnected; and to instruct the movable object to exit the backtrack return mode in response to the remote control signal being recovered.

In some embodiments, the processor 604 may be configured to, in response to the signal strength of the remote control signal being greater than the strength threshold, send a movement mode inquiry signal; to receive a movement mode reply signal; and to determine a movement mode of the movable object according to the movement mode reply signal.

In some embodiments, the movement mode may include a backtrack return-to-start-point mode, a straight-line return-to-start-point mode, and/or a remote control mode.

Figure 7:
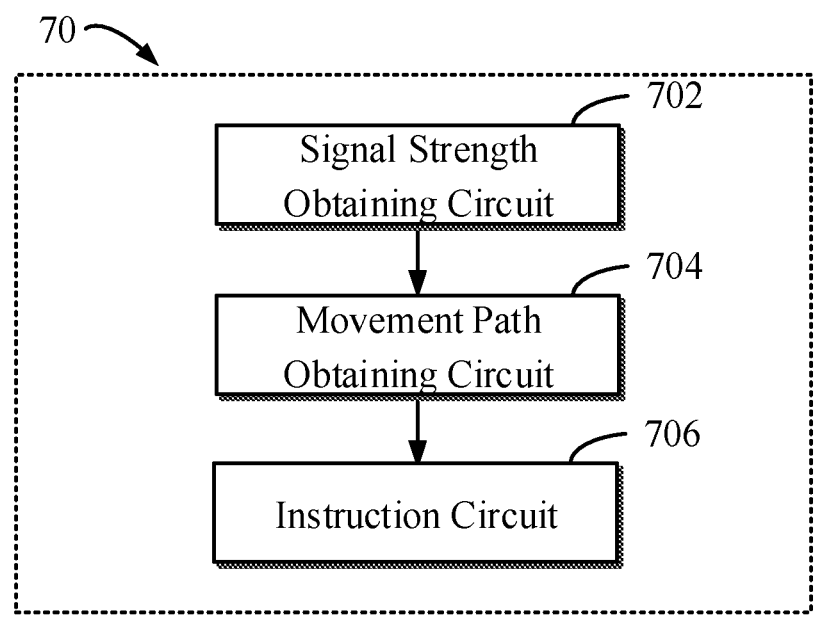
FIG. 7 illustrates another schematic block diagram of an exemplary device for controlling a movable object consistent with various disclosed embodiments of the present disclosure.

FIG. 7 illustrates a schematic block diagram of an exemplary device 70 for controlling a movable object consistent with various disclosed embodiments of the present disclosure.

As shown in FIG. 7, the device 70 includes a signal strength obtaining circuit 702, a movement path obtaining circuit 704, and an instruction circuit 706. In some embodiments, the signal strength obtaining circuit 702 may be configured to obtain a signal strength of a remote control signal transmitted to the movable object. The movement path obtaining circuit 704 may be configured to obtain a movement path of the movable object in response to the signal strength being less than a preset strength threshold. The instruction circuit 706 may be configured to instruct the movable object to enter a backtrack return mode in which the movable object returns along the movement path, and to instruct that the movable object to exit the backtrack return mode in response to the signal strength being greater than the strength threshold.

In some embodiments, the movement path obtaining circuit 704 may be configured to obtain a movement path beginning at a movement start point of the movable object. Further, the instruction circuit 706 may be configured to instruct the movable object to continue to return to the movement start point after instructing the movable object to exit the backtrack return mode.

In some embodiments, the instruction circuit 706 may be configured to instruct the movable object to enter a backtrack return-to-start-point mode in which the movable object continues to return to the movement start point along the movement path.

In some embodiments, the instruction circuit 706 may be configured to instruct the movable object to enter a straight-line return-to-start-point mode in which the movable object continues to return to the movement start point along a straight line.

In some embodiments, the instruction circuit 706 may be configured to instruct the movable object to enter a backtrack return-to-start-point mode or a straight-line return-to-start-point mode according to a remaining power amount of the movable object.

In some embodiments, the movement path obtaining circuit 704 may be further configured to obtain a movement intermediate point of the movable object. The instruction circuit 706 may further include a first instruction sub-circuit configured to instruct the movable object to return to the movement intermediate point along the movement path, a return path determination circuit configured to determine a return path from the movement intermediate point to the movement start point, a second instruction sub-circuit configured to instruct the movable object to return to the movement start point along the return path.

In some embodiments, the movement intermediate point may include a signal recovery point at which the strength of the remote control signal is greater than the strength threshold.

In some embodiments, the return path may include a portion of the movement path.

In some embodiments, the instruction circuit 706 may be further configured to instruct the movable object to enter a remote control mode, after instructing the movable object to exit the backtrack return mode. In the remote control mode, the movable object moves according to a remote control signal.

In some embodiments, the movement path obtaining circuit 704 may be configured to obtain a movement path beginning at a preset point. Further, the instruction circuit 706 may be configured to instruct the movable object to continue to return to the preset point after instructing the movable object to exit the backtrack return mode.

In some embodiments, the device 70 may further include a recording circuit for recording a movement path of the movable object.

In some embodiments, the recording circuit may be further configured to periodically record position information and time information of the movable object at preset time intervals.

In some embodiments, the recording circuit may be configured to record position information and time information of the movable object at variable time intervals according to speed and movement direction of the movable object.

In some embodiments, the position information may include longitude, latitude, and/or altitude of the movable object.

In some embodiments, the movement path obtaining circuit 704 may be configured to obtain a movement path of the movable object in response to the remote control signal being disconnected. The instruction circuit 706 may be configured to instruct the movable object to exit the backtrack return mode, in response to the remote control signal being recovered.

In some embodiments, the device 70 may further include a sending circuit configured to, in response to the signal strength of the remote control signal being greater than the strength threshold, send a movement mode inquiry signal, a receiving circuit configured to receive a movement mode reply signal, and a movement mode determination circuit configured to determine a movement mode of the movable object according to the movement mode reply signal.

In some embodiments, the movement mode may include a backtrack return-to-start-point mode, a straight-line return-to-start-point mode, and/or a remote control mode.

In some embodiments, the device 70 may further include a signal strength sensor for detecting the signal strength of the remote control signal in real time.

Figure 8:
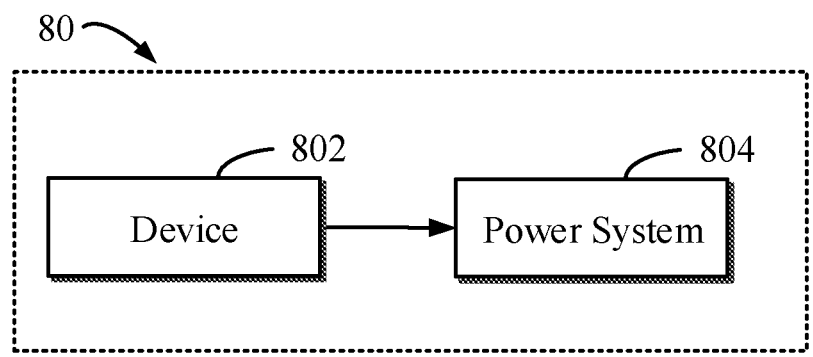
FIG. 8 illustrates a schematic block diagram of an exemplary UAV consistent with various disclosed embodiments of the present disclosure.

FIG. 8 illustrates a schematic block diagram of an exemplary UAV 80 consistent with various disclosed embodiments of the present disclosure.

As shown in FIG. 8, the UAV 80 includes a device 802 and a power system 804. In some embodiments, the device 802 may include the device 60 shown in FIG. 6, which can send instructions to the power system 804 to drive the UAV 80. In some other embodiments, the device 802 may include the device 70 shown in FIG. 7, which can send control signals to the power system 804 to drive the UAV.

In the embodiments of the present disclosure, the processor may include a central processing unit (CPU), a network processor (NP), or a combination of a CPU and an NP. The processor may further include a hardware chip. The hardware chip may include an application-specific integrated circuit (ASIC), a programmable logic device (PLD), or a combination thereof. The PLD may include a complex programmable logic device (CPLD), a field-programmable gate array (FPGA), a generic array logic (GAL) or any combination thereof.

Transmitter and receiver of the present disclosure may include a transmitter and receiver based on infrared, bluetooth, near field communication, Wi-Fi, ZigBee, wireless universal serial bus (USB), radio frequency, and/or wireless communication methods based on 2.4 GHz or 5.8 GHz.

Embodiments of the present disclosure can be applied to various types of UAVs. For example, the UAV can include a small UAV. In some embodiments, the UAV may include a rotorcraft, such as a multi-rotor aircraft that is propelled by air by a plurality of propulsion apparatuses. Embodiments of the disclosure are not limited thereto, and the UAV may include another type of UAV or a mobile apparatus.

Those of ordinary skill in the art will appreciate that the exemplary elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

For simplification purposes, detailed descriptions of the operations of exemplary systems, devices, and units may be omitted and references can be made to the descriptions of the exemplary methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit. The above-described integrated units can be implemented in electronic hardware, or in a combination of computer software and electronic hardware.

A method consistent with the disclosure can be implemented in the form of computer program stored in a non-transitory computer-readable storage medium, which can be sold or used as a standalone product. The computer program can include instructions that enable a computing device, such as a processor, a personal computer, a server, or a network device, to perform part or all of a method consistent with the disclosure, such as one of the exemplary methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A method for controlling a movable object comprising:
    obtaining a signal strength of a remote-control signal sent from a remote-control to the movable object;
    obtaining a movement path of the movable object beginning at a movement start point of the movable object in response to the signal strength being less than a preset strength threshold;

controlling the movable object to enter a backtrack return mode to return along the movement path;
controlling the movable object to exit the backtrack return mode in response to the signal strength being greater than the preset strength threshold; and
controlling the movable object to continue to return to the movement start point after controlling the movable object to exit the backtrack return mode, including:
controlling the movable object to enter a straight-line return-to-start-point mode to return to the movement start point along a straight line.

2. The method according to claim 1, wherein controlling the movable object to continue to return to the movement start point comprises:
controlling the movable object to enter a backtrack return-to-start-point mode to continue to return to the movement start point along the movement path.

3. The method according to claim 1, wherein controlling the movable object to continue to return to the movement start point comprises:
controlling the movable object to enter a backtrack return-to-start-point mode to continue to return to the movement start point along the movement path or to enter a straight-line return-to-start-point mode to return to the movement start point along a straight line, according to a remaining power amount of the movable object.

4. The method according to claim 1, wherein:
obtaining the movement path further comprises obtaining a movement intermediate point of the movable object, and
controlling the movable object to continue to return to the movement start point comprises:
controlling the movable object to return to the movement intermediate point along the movement path,
determining a return path from the movement intermediate point to the movement start point, and
controlling the movable object to return to the movement start point along the return path.

5. The method according to claim 4, wherein the movement intermediate point controlling a signal recovery point at which the signal strength of the remote control signal becomes greater than the preset strength threshold.

6. The method according to claim 4, wherein the return path includes a portion of the movement path.

7. The method according to claim 4, wherein controlling the movable object to continue to return to the movement start point further comprises:
controlling the movable object to return to the movement start point from the intermediate point along a straight line.

8. The method according to claim 1, further comprising, after controlling the movable object to continue to return to the movement start point:
prohibiting the movable object from entering the backtrack return mode.

9. The method according to claim 1, further comprising, after controlling the movable object to exit the backtrack return mode:
controlling the movable object to enter a remote control mode in which the movable object moves according to the remote control signal.

10. The method according to claim 1,
wherein obtaining the movement path controlling obtaining a movement path beginning at a preset point,
the method further comprising:
controlling the movable object to continue to return to the preset point after controlling the movable object to exit the backtrack return mode.

11. The method according to claim 1, further comprising:
recording the movement path.

12. The method according to claim 11, wherein recording the movement path comprises:
periodically recording position information and time information of the movable object at preset time intervals.

13. The method according to claim 12, wherein the position information comprises at least one of a longitude, a latitude, or an altitude of the movable object.

14. The method according to claim 11, wherein recording the movement path comprises:
recording position information and time information of the movable object at variable time intervals according to a speed and a movement direction of the movable object.

15. The method according to claim 14, wherein the position information comprises at least one of a longitude, a latitude, or an altitude of the movable object.

16. The method according to claim 1, wherein:
obtaining the movement path in response to the signal strength being less than the preset strength threshold comprises obtaining the movement path in response to the remote control signal being disconnected, and
controlling the movable object to exit the backtrack return mode in response to the signal strength being greater than the strength threshold includes controlling the movable object to exit the backtrack return mode in response to a recovery of the remote control signal.

17. The method according to claim 1, further comprising:
sending a movement mode inquiry signal in response to the signal strength of the remote control signal being greater than the strength threshold;
receiving a movement mode reply signal; and
determining a movement mode of the movable object according to the movement mode reply signal.

18. The method according to claim 17, wherein the movement mode comprises at least one of a backtrack return-to-start-point mode, a straight-line return-to-start-point mode, or a remote control mode.

* * * * *